United States Patent [19]

Heim et al.

[11] Patent Number: 4,927,867

[45] Date of Patent: May 22, 1990

[54] PROCESS FOR THE MANUFACTURE OF AN IMPACT-RESISTANT THERMOPLASTIC RESIN

[75] Inventors: Philippe Heim; Gerard Riess, both of Mulhouse, France

[73] Assignee: Norsolor, Cedex, France

[21] Appl. No.: 234,052

[22] Filed: Aug. 19, 1988

[30] Foreign Application Priority Data

Aug. 20, 1987 [FR] France ................... 87 11758

[51] Int. Cl.$^5$ ............................................. C08J 3/00
[52] U.S. Cl. ................................. 523/339; 523/336; 524/923; 525/267; 525/279
[58] Field of Search .............. 525/267, 279; 524/923; 523/339, 336

[56] References Cited

U.S. PATENT DOCUMENTS

| | | | |
|---|---|---|---|
| 3,450,796 | 6/1969 | Girffin et al. | 525/292 |
| 3,950,455 | 4/1976 | Okamoto et al. | 525/53 |
| 4,141,932 | 2/1979 | Butler | 525/252 |

FOREIGN PATENT DOCUMENTS

| | | |
|---|---|---|
| 2524471 | 1/1976 | Fed. Rep. of Germany . |
| 49-2347 | 1/1974 | Japan . |
| 49-11748 | 3/1974 | Japan . |
| 49-11749 | 3/1974 | Japan . |
| 50-31598 | 10/1975 | Japan . |
| 53-44959 | 12/1978 | Japan . |
| 54-18893 | 7/1979 | Japan . |
| 56-50907 | 12/1981 | Japan . |
| 57-36102 | 3/1982 | Japan . |

*Primary Examiner*—Melvyn I. Marquis
*Assistant Examiner*—Karen A. Hellender
*Attorney, Agent, or Firm*—Finnegan, Henderson, Farabow, Garrett & Dunner

[57] ABSTRACT

A process for preparing a rubber modified thermoplastic resin, in which a latex in aqueous emulsion is prepared in the presence of an ionic surfactant; a vinyl monomer insoluble or substantially insoluble in water is added, and the particles of the latex are transferred to the monomer to form an organic phase using a transfer agent of opposite charge to the surfactant; and a polymerization of the organic phase is performed.

14 Claims, 1 Drawing Sheet

PROCESS FOR THE MANUFACTURE OF AN IMPACT-RESISTANT THERMOPLASTIC RESIN

BACKGROUND OF THE INVENTION

The present invention relates to an improved process for the manufacture of a rubber modified thermoplastic resin. The invention also encompasses a resin made by this process.

Impact-resistant thermoplastic resins are conventionally obtained by hot mixing a powder resulting from the steps of coagulation, dewatering and drying of an elastomeric latex with the particles of a thermoplastic resin or "hard" polymer, resulting in what is called an "alloy." This process is unsatisfactory regarding both economy and the quality of the alloy.

To overcome these disadvantages, processes have already been proposed in which the abovementioned dewatering and drying steps are eliminated. In these processes, an emulsion of the elastomeric latex is followed directly by the polymerization of the thermoplastic resin. Polymerization results from the addition of electrolytes, acids and unsaturated monomer to the elastomeric latex which, after polymerization, should produce the thermoplastic matrix. These electrolytes or acids are destablizing agents which neutralize the stabilizing effect of an ionic surfactant present on the elastomeric latex, causing the latter to flocculate. When monomer is added after the destablizing agent, more or less rapid swelling by the monomer takes place. It is thus possible to end with a suspension polymerization. When the monomer is added before the destablizing agent, the latter will cause an instantaneous transfer of the latex particles into the monomer, resulting in an organic phase containing a rubbery dispersion, which can then be polymerized in suspension or in bulk. Such techniques are described in Japanese Pat. Nos. 82-36,102, 78-44,959, 81-50,907, 74-02,347, 74-11,748, 74-11,749, 79-18,893, 75-31,598, U.S. Pat. Nos. 4,141,932, 3,450,796, and 3,950,455, and German Pat. No. 2,524,471.

These processes, however, require the use of large quantities of coagulating agents. In fact, the examples of Japanese Pat. No. 75-31,598 show that a proportion of approximately 3% by weight of magnesium sulfate, relative to the final resin, is generally needed to destabilize the latex. Moreover, suspension polymerization is difficult in the case of a quantity greater than 35% by weight, relative to the final resin, of elastomeric particles, comprising a surface graft of "hard" polymer (hereinafter "grafted particles"), owing to the viscosity of the solution of the monomer in which these particles are dispersed and swollen.

As a result, research has been carried out to propose a process for the production of rubber-modified, impact-resistant thermoplastic resins, substantially free from the disadvantages referred to above.

SUMMARY OF THE INVENTION

The present invention relates to a process for the manufacture of an impact-resistant thermoplastic resin, including the step of transferring the particles of a reinforcing latex into the monomers of the matrix using ionic agents. It also relates to the modified thermoplastic resins which are produced by this process. The present invention comprises the steps of:

(a) preparing an aqueous emulsion of elastomeric latex in the presence of an ionic surfactant, from at least one ethylenically unsaturated monomer ("the base monomer") (which may be chosen, for example, from the group consisting of dienes, substituted dienes, alkyl acrylates, aralkyl acrylates, and olefins);

(b) adding at least one water-insoluble or substantially water-insoluble vinyl monomer (which may be chosen, for example, from alkyl methacrylates with alkyl groups from 1 to 4 carbon atoms, styrene, substituted styrenes, acrylonitrile, methacrylonitrile and vinyl halides) to the latex along with a transfer agent carrying ionic charges opposite to those of the surfactant employed in step (a) to produce the transfer of the particles of the latex into the vinyl monomer;

(c) polymerizing (for example, by bulk or suspension polymerization) the vinyl monomer from step (b).

DESCRIPTION OF THE PREFERRED EMBODIMENT

Figure 1:
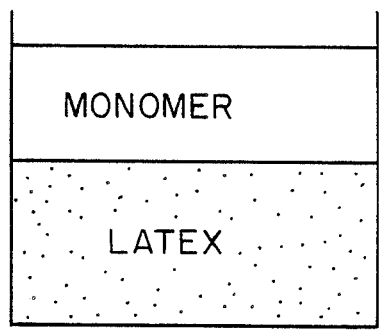
FIG. 1 shows the system of matrix monomer and latex prior to the addition of a transfer agent in step (b) of the present invention.

In step (a), an aqueous emulsion of an elastomeric latex is prepared from the base monomer, in the presence of an ionic surfactant. Useful ionic surfactants are known in the art, and include sodium lauryl sulfate and potassium laurate, among others. The quantity of base monomer is preferably chosen so that the thermoplastic resin produced may contain from 1 to 90% by weight of elastomeric component. The latex prepared in step (a) is a modifying agent intended to reinforce the rigid thermoplastic matrix. Furthermore, it can advantageously be chosen so as to impart transparency to the final resin.

Butadiene, isoprene, chloroprene and 2,3-dimethyl-butadiene are dienes which, among other dienes, can be employed as the base monomer in the invention. Among the alkyl acrylates which can alternatively be employed as the base monomer of step (a) are those containing one to fifteen carbons, preferably one to eight carbons, and most preferably two to eight carbons in the alkyl group. These include (for example) n-butyl acrylate, ethyl acrylate, 2-ethylhexyl acrylate and iso-butyl acrylate. It is also possible to use alkyl acrylates having longer alkyl carbon chains. Aralkyl acrylates also useful in connection with step (a) of the invention are those in which the cyclic moiety contains 5, 6, or 7 carbon atoms, with or without an additional alkyl bridge, with the alkyl moiety containing up to 15 carbon atoms. Other useful acrylates include substituted acrylates, such as alkylthioalkyl acrylates (e.g., alkylthioethyl acrylate), alkoxyalkyl acrylates (e.g., alkylthioethyl acrylate) and alkoxyalkyl acrylates (e.g., methoxyethyl acrylate). Among the olefins which may be employed in step (a) are ethylene, isobutylene and α-olefins containing from 3 to 12 carbon atoms.

Copolymerizable monomers which are useful in step (a) of the process are lower alkyl acrylates and methacrylates, lower alkoxy acrylates, cyanoethyl acrylate, acrylamide, lower hydroxyalkyl acrylates, lower hydroxylakyl methacrylates, acrylic acid, methanacrylic acid, acrylonitrile, styrene, substitutes styrenes and alkyl methacrylates. Styrene, acrylonitrile and methyl methacrylate are especially useful.

As is known in the art, when the latex is prepared substantially from dienes or acrylates, it is obtained directly by an emulsion polymerization of these monomers. Alternatively, when the latex consists substantially of olefins, e.g., polyisobutylene, or ethylene-propylene or ethylene-propylene-diene rubber, these polymers are first prepared by cationic polymerization or by Ziegler-Natta catalysis. They are then dissolved in a solvent, which is subsequently evaporated off after the addition of water and a surfactant.

Furthermore, still in step (a), one or more crosslinking monomers can be added to the base monomer, in a quantity up to 20 parts by weight per 100 parts by weight of the base monomer. The crosslinking monomers are chosen from monomers generally employed for this purpose, and particularly from the group consisting of polyol polymethacrylates and polyacrylates (e.g., alkylene glycol); dimethacrylates (e.g., ethylene glycol dimethacrylate, 1,3-butylene glycol dimethacrylate and propylene glycol dimethacrylate); alkylene glycol diacrylates (e.g., ethylene glycol diacrylate, 1,3- or 1,4-butylene glycol diacrylate and trimethylopropane trimethacrylate); polyvinylbenzenes (e.g., divinylbenze, trivinylbenzene, or ethylvinylbenzene); vinyl acrylate; and methacrylate.

It is also possible in step (a) to add to the base monomer at least one graft monomer in a quantity from 0.5 to 10 parts by weight per 100 parts by weight of said monomer. The use of at least one graft monomer is especially preferred in the case where the base monomer is something other than butadiene or substituted butadienes. After the polymerization, the graft monomers leave residual unsaturations which will enable the polymer formed to be grafted in a subsequent step, whether in the optical step (a1) described later, or else in step (b).

The graft monomer is chosen from monomers which are generally employed for this purpose, and particularly from the group consisting of copolymerizable allyl, methallyl or crotyl esters of α,β-unsaturated carboxylic or dicarboxylic acids (e.g., allyl, methallyl and crotyl esters of acrylic acid, of methacrylic acid, of maleic acid (mono- and diesters), of fumaric acid (mono- and diesters) and of itaconic acid (mono-and diesters)); allyl ether, methallyl ether and crotyl vinyl ether; allyl thioether, methallyl thioether and crotyl vinyl thioether; N-allyl-, methallyl- and crotylmaleimide; vinyl esters of 3-butenoic acid and of 4-pentenoic acid; triallyl cyanurate; O-allyl, methallyl or crotyl-O-allyl, aryl, alkaryl or aralkyl-P-vinyl; allyl or methallyl phosphonate; triallyl, trimethallyl or tricrotyl phosphate; O-vinyl, O,O-diallyl, dimethallyl or dicrotyl phosphate; cycloalkenyl esters of acrylic acid, methacrylic acid, maleic acid (mono- and diesters), fumaric acid (mono- and diesters), itaconic acid (mono- and diesters) e.g., as 2-, 3- or 4-cyclohexenyl acrylate); bicyclo[2,2,1]-5-hepten-2-yl esters of acrylic acid, methacrylic acid, maleic acid (mono- and diesters), fumaric acid (mono- and diesters) and itaconic acid (mono- and diesters); vinyl ethers and vinyl thioethers of cycloalkenols and of cycloalkenethiols (e.g., a vinyl-4-cyclohexen-1-yl ether and vinyl bicyclo[2,2,1]-5-hepten-2-ol ether); vinyl esters of cycloalkenecarboxylic acids (e.g., vinyl-3-cyclohexene-1-carboxylic acid and vinyl bicyclo[2,2,1]-5-heptene-2-carboxylate).

Among the graft monomers which may be employed, preference is given to compounds containing at least one allyl group; in particular, the allyl esters of ethylenically unsaturated acids. The most preferred are allyl acrylate, allyl methacrylate, diallyl maleate, diallyl fumarate, diallyl itaconate, allyl hydrogen maleate, allyl hydrogen fumarate and allyl hydrogen itaconate. The allyl diesters of polycarboxylic acids which do not contain any polymerizable unsaturation are also employed to advantage as graft monomers in step (a).

Step (a) is generally, but not necessarily, followed by an additional step (a1) in which at least one monoethylenically unsaturated monomer belonging to the group of the monomers introduced in step (b) undergoes an emulsion polymerization with the latex produced in step (a). Examples of such step (b) monomers are provided below in the description of step (b). The objective of this step (a1) is to "graft" a polymer compatible with the thermoplastic resin into the surface of the elastomeric particles of the latex from step (a). These monomers will hereinafter ne referred to as "compatibilization monomers." In addition, the expressions "grafted particles" and "grafted latex" are used below to indicate that step (a1) has occurred.

When step (a1) is employed, it is desirable that at least one graft monomer is employed in step (a), leaving, after polymerization, residual unsaturations to promote grafting of a step (b) monomer during this step (a1).

In step (a1), there are preferably employed from 99 to 15 parts by weight of the solid part of the latex from step (a), and from 1 to 85 parts by weight of the compatibilization monomers, per 100 parts by weight of the mixture of latex and compatibilization monomer. Additionally, at least one crosslinking monomer may be added in step (a1) to the compatibilization monomers employed, in a quantity ranging up to 5 parts by weight per 100 parts by weight of the compatibilization monomers. The crosslinking monomers useful in this step are the same as those indicated above in step (a). At least one grafting monomer, such as defined in step (a), can also be added during step (a1).

The emulsion polymerizations in these steps (a) and (a1), which are performed in the presence of a free radical initiator (e.g., a persulfate), do not require unusual reaction conditions and any of the ingredients known to the person skilled in the art may be employed.

Step (b) involves the transfer of the latex particles obtained during the preceding step or steps into the monomer (hereinafter, "the matrix monomer") intended to form the matrix. The principle of this transfer is shown diagrammatically in FIGS. 1 and 2.

Figure 2:
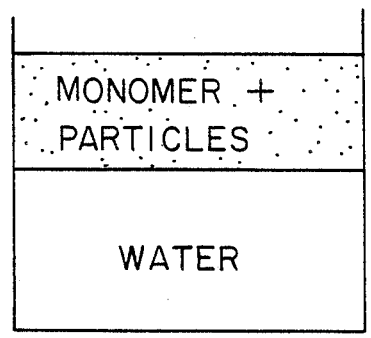
FIG. 2 shows the system of FIG. 1 after the addition of a transfer agent in step (b) of the present invention.

The matrix monomer is added to the elastomeric polymer latex from step (a) or alternatively step (a1), resulting in two phases, as shown in FIG. 1. These phases are then stirred sufficiently to transfer the latex particles completely into the matrix monomer, by the addition of a transfer agent which destabilizes the latex. This results in an organic phase containing the elastomeric particles, well dispersed, and optionally grafted, in a swollen state. This organic phase separates from the aqueous phase, which will be practically clear. These phases are shown in FIG. 2.

The matrix monomers employed in step (b) are insoluble or substantially insoluble in water. These may be alkyl methacrylates (e.g., methyl methacrylate, which is preferred, isopropyl methacrylate, secondary butyl methacrylate, tert-butyl methacrylate), or styrene and substituted styrenes (e.g., α-methylstyrene, monochlorostyrene and ter-butyl styrene), among others.

Monoethylenically unsaturated comonomers may also be introduced in this step. These include those indicated above for the preparation of the latex of step (a).

Vinyl halides, particularly vinyl chloride, may also be used in this step (b). The monoethylenically unsaturated comonomers which may then be employed are vinyl esters (e.g., vinyl acetate, vinyl propionate, vinyl butyrate, vinyl chloroacetate, vinyl chloropropionate, vinyl benzoate, vinyl chlorobenzoate and others), as well as acrylic and α-acrylic acids (e.g., acrylic acid, methacrylic acid, methyl acrylate, ethyl acrylate, butyl acrylate, methyl methacrylate, acrylamide, N-methylacrylamide and methacrylamide).

At least 10 parts by weight of the matrix monomer per 100 parts by weight of the solid part of the latex obtained at the end of step (a) or (a1) are generally employed in this step (b).

The quantity of transfer agent to be added in step (b) is selected so that the transfer is complete when the ionic stabilizing charges of the optionally grafted elastomeric latex are stoichiometrically neutralized by the opposite charges of the transfer agent. The transfer agent may be an ionic surfactant with charges opposite to those of the surfactant employed in step (a), or a polyanion or polycation, depending on the charge to be neutralized. It may also comprise a latex synthesized in the presence of a surfactant with charges opposite to those of the surfactant employed in step (a).

Cationic surfactants which may be employed in step (b) as the transfer agent include quaternary onium (e.g., ammonium, phosphonium or pyridinium) salts with a hydrophobic substituent, e.g., a long-chain alkyl residue. It is also possible to employ quaternary-onium salts with a sterically hindering substituent, e.g., methylene blue or cyclohexylamine acetate.

When a polycation is employed as transfer agent, it is preferably from the group consisting of quaternized poly(vinylpyridines), quaternized poly(vinylbenzylamines), quaternized celluloses, quaternized polyvinyl alcohols and quaternized poly(alkyl methacrylates).

When a latex is employed as transfer agent, the latex is preferably obtained from monomers of the same type as those employed in step (b).

The transfer in step (b) is generally performed at a temperature ranging from 0° C. to approximately 100° C. However, the temperature is not a crucial factor in this step.

In the organic phase obtained at the end of step (b), the particles of optionally grafted elastomer are in an individual, swollen state and are not combined by fusion. The viscosity of this organic phase containing the transferred particles depends on the quantity of transferred particles and, above all, on their swelling index, $H_\nu$. $H_\nu$ is defined as the ratio of the volume of the swollen polymer in the matrix and other monomer of step (b) to the volume of the dry polymer.

There also exists in this phase a range whose limiting concentrations are $C_1$ and $C_2$ (with $C_1 < C_2$), which are expressed as the weight of transferred particles per 100 parts by weight of final resin, and which depend on the swelling index $H_\nu$ and on the morphology of the particles of preferably grafted rubbery component. Between these limiting concentrations, the viscoelastic character of the organic phase containing these transferred particles is such that it is difficult to disperse the organic phase directly with the aid of dispersing agents, with a view toward suspension polymerization in step (c).

In the case of concentrations lower than $C_1$ or higher than $C_2$, easy dispersion of the organic phase can be ensured by resorting preferably to a transfer agent of the latex type.

In the experiments carried out by the inventors, the lowest value obtained for $C_1$ was close to 35% by weight and the highest value for $C_2$ was close to 50% by weight. Furthermore, it was observed that as $H_\nu$ increases, $C_1$ diminishes.

When the solid part of the latex obtained at the end of step (a) or (a1) has a concentration below $C_1$, the solution of monomer in which the latex is dispersed is a somewhat viscous fluid which can be polymerized in bulk, or dispersed with the aid of a conventional dispersing agent with a view toward suspension polymerization in step (c). The dispersing agent which may be employed is selected from the group consisting of hydroxyethyl cellulose, methyl cellulose, polyacrylamide, carboxymethyl cellulose, polyvinyl alcohol, gelatins, water-soluble alginates, copolymers of (meth)acrylic acid(s) and of methyl methacrylate, and copolymers containing hydrophobic and hydrophilic groups in general. The preferred dispersing agent is polyvinyl alcohol. The dispersing agents are generally employed in aqueous solution, in a proportion of 0.05 to 3% by weight relative to the final resin.

When the solid part of the latex obtained at the end of step (a) or (a1) has a concentration greater than $C_2$, the organic phase containing the transferred latex particles is self-dispersed, during the transfer, in the form of nonadhesive rubbery clots between 50 μm and 1.5 mm in size. Furthermore, it is preferable to add a conventional dispersing agent (usually employed in suspension polymerizations), at the same time as the transfer agent. In this case, a suspension polymerization is self-evident. Examples of dispersing agents are set forth above, and are employed in the same quantities as those indicated there.

It is more difficult to obtain an impact-resistant alloy containing a proportion of between $C_1$ and $C_2$ or the optionally grafted elastomeric particles by suspension polymerization. At these intermediate concentrations of transferred elastomeric particles, the organic phase containing these dispersed particles is pasty and sticky, and difficult to disperse into pearl form in a conventional manner, with a view toward suspension polymerization in step (c). This can be remedied by adding a latex as a transfer agent. The latex should preferably be uncrosslinked and stabilized with the aid of an ionic surfactant. This ionic latex (which will be transferred at the same time as the ionic latex from step (a) or (a1) is intended to raise the viscosity of the organic phase containing the transferred particles to reach a viscosity value which is at least as high as if a concentration of greater than $C_2$ of grafted elastomeric particles were being transferred, as in the preceding case. This produces a fine (50–300 μm diameter) dispersion of matrix monomer containing the polymer particles from step (a) or (a1) and the soluble polymer of the transferring ionic latex, which can then be polymerized in suspension in step (c). The final suspension polymerization will be faster, in view of the fact that there will be less matrix monomer to be polymerized.

In order that the transfer should be quantitative, the number of ionic charges present in the transferring latex must be equal to the number of opposite ionic charges carried by the latex to be transferred. It is also possible, in this case, to employ a transfer agent an ionic-latex ionic surfactant mixture (e.g., cationic latex and cationic surfactant if the surfactant present on the latex from step (a) is anionic).

After the transfer in step (b) has taken place, it is still possible to adjust the weight relationship of the final thermoplastic resin to the optionally grafted elastomer, by diluting the organic phase with the matrix monomer.

Step (c) of the process according to the invention is the polymerization, preferably by suspension or bulk polymerization, of the matrix monomer, including the dispersed elastomeric particles. Polymerizations of this type are carried out under known stirring, temperature and reaction time conditions.

In the case of a suspension polymerization, the dispersion obtained at the end of step (b) is heated, preferably to between 60° and 100° C., for a sufficient time to obtain complete polymerization of the monomer, at a stirring rate of the order of 300–400 rpm, under a nitrogen atmosphere. The polymerization time depends on the proportion of rubbery component which is present, and is generally of the order of 3 to 5 hours. The disperse phase/aqueous phase ratio is generally between 0.1 and 1.5. Furthermore, dispersing agents (e.g., those indicated above) and inorganic salts may be added during the polymerization in order to obtain an ideal pearl size (which is approximately 200–300 μm). When the reaction is complete, the reactor is emptied and then, after decanting, washing and drying, the reinforced thermoplastic resin is recovered in pearl form.

In the case of a bulk polymerization the water must be separated by decanting and centrifuging at the end of step (b). The polymerization is generally carried out at a temperature ranging from 50° to 200° C.

To further illustrate the subject matter of the invention, descriptions of several examples of the use of the invention are provided below. These are not intended to imply any limitation.

EXAMPLE 1

This example relates to the preparation of an alloy of impact poly(methyl methacrylate), containing 19% by weight of a grafted elastomeric polymer.

Step (a): Preparation of a latex of butyl acrylate/styrene copolymer by emulsion copolymerization.

The materials employed in this polymerization were:

| Material | Quantities introduced (parts by weight) |
|---|---|
| Butyl acrylate | 78.5 |
| Styrene | 21.5 |
| Sodium lauryl sulfate | 0.63 |
| Ethylene glycol dimethacrylate (crosslinking monomer) | 4.2 |
| Potassium persulfate | 0.42 |
| Deionized water | 314 |

Water and sodium lauryl sulfate were mixed in a glass reaction vessel fitted with a stirrer. This mixture was heated to 70° C. Butyl acrylate, styrene and the cross-linking monomer were added, followed by potassium persulfate in aqueous solution. The resulting mixture was stirred at a rate of the order of 250 rpm while the temperature was maintained at 70° C. The polymerization time was 4 hours. The resulting latex had a solid content of 24.8% by weight, a mean particle diameter of 72 nm, and a swelling index in methyl methacrylate of 3.9.

Step (a1): Grafting of poly(methyl methacrylate) onto the latex from step (a).

| Materials | Quantities introduced (parts by weight) |
|---|---|
| Latex from step (a) | 49.6 (solid part) |
| Methyl methacrylate | 45 |
| Potassium persulfate | 0.2 |
| Deionized water present | 300 |
| Ethylene glycol dimethacrylate | 1.4 |

This polymerization was carried out in a glass reaction vessel fitted with a stirrer, under a nitrogen atmosphere, at 70° C., for 3 hours. The degree of polymerization was 99.9%. The resulting grafted acrylic latex had a solid content of 23.8% and a mean particle diameter of 86.5 nm.

Step (b): Transfer of the particles of the grafted acrylic latex from step (a1) into methyl methacrylate.

100 parts by weight of methyl methacrylate, 0.375 part by weight of lauroyl peroxide and 0.375 part by weight of lauryl mercaptan were added to 100 parts by weight of the latex from step (a1), and the resulting mixture was stirred. Thereafter, 0.16 part by weight of hexadecyltrimethylammonium chloride was added in 40 parts of water, followed, after one minute, by a mixture consisting of 0.075 part by weight of a methyl methacrylate/acrylic acid copolymer, 0.75 part by weight of disodium phosphate and 14.2 parts by weight of water.

Step (c): Polymerization of the organic phase the system from step (b).

This polymerization was carried out for approximately 2 hours at 70° C. and then for 1 hour at 90° C. The resulting pearls were then recovered and treated in the usual manner. These pearls were molded at a pressure of 200 bars and at 180° C. in order to produce small plaque, which was both transparent and impact-resistant. Inspection of a section of resin by electron microscopy revealed that the elastomeric particles were well dispersed and with no occlusion.

EXAMPLE 2

This example relates to the preparation of an alloy of the butadiene/acrylonitrile/styrene copolymer type, containing 59.6% by weight of grafted rubbery polymer.

Step (a): Preparation of a polybutadiene latex.

The materials employed in this polymerization were:

| Materials | Quantities introduced (parts by weight) |
|---|---|
| Butadiene | 100 |
| Potassium laurate | 0.9 |
| Potassium persulfate | 0.4 |
| Deionized water | 220 |
| Potassium hydroxide | 0.2 |

Water, potassium laurate and potassium hydroxide were introduced into a glass reaction vessel fitted with a stirrer, and the mixture was heated to 70° C. Butadiene was then added, followed by potassium persulfate in aqueous solution. The mixture was stirred at a rate of the order of 250 rpm, while the temperature was maintained at 70° C. The polymerization took place over a period of 6 hours. A polybutadiene latex with a particle diameter of 90 nm and a 31% solid content resulted.

Step (a1): Grafting of an acrylonitrile/styrene copolymer onto the latex from step (a).

The materials employed for this grafting were:

| Materials | Quantities introduced (parts by weight) |
| --- | --- |
| Latex obtained in step (a) | 14.5 (solid part) |
| Styrene | 9.1 |
| Acrylonitrile | 2.9 |
| Potassium persulfate | 0.1 |
| Distilled water present | 73.4 |

This polymerization was carried out under a stream of nitrogen, for 5 hours at 70° C. The latex obtained had a mean particle diameter of 110 nm and has a solid content of 26.6%.

Step (b): Transfer of the particles of the grafted polybutadiene latex from step (a1) into a mixture of styrene and acrylonitrile.

In this step, 32.4 parts by weight of styrene, 10.3 parts by weight of acrylonitrile, 0.2 part by weight of lauryl mercaptan and 0.3 part by weight of lauroyl peroxide were added to 240 parts by weight of the latex obtained in step (a1). This mixture was then stirred, and another mixture consisting of 0.333 part by weight of lauryle-thyldimethylammonium bromide, 0.12 part by weight of polyvinyl alcohol (marketed under the trade name "Rhodoviol 135") and 148 parts by weight was added. After stirring for a few seconds, a stable dispersion of pearls with a diameter of approximately 500 μm to 1 mm was obtained.

Step (c): Suspension polymerization of the organic phase of the system from step (b).

The dispersion obtained in step (b) was polymerized in suspension for 10 hours at 60° C. The pearls obtained were recovered and treated in the conventional manner.

EXAMPLE 3

This example relates to the preparation of an alloy of the impact poly(methyl methacrylate) type, containing 54.6% by weight of particles of grafted elastomeric polymer.

Step (a): Preparation of a latex of butyl acrylate/styrene copolymer by emulsion copolymerication.

The materials employed in this polymerization were:

| Materials | Quantities introduced (parts by weight) |
| --- | --- |
| Butyl acrylate | 80.7 |
| Styrene | 19.3 |
| Sodium lauryl sulfate | 0.31 |
| Divinylbenzene (crosslinking monomer) | 1.6 |
| Potassium persulfate | 0.62 |
| Deionized water | 375 |

Water and sodium lauryl sulfate were mixed in a glass container fitted with a stirrer, and the mixture was heated to 70° C. 50% by weight of a mixture of butyl acrylate and styrene was added, followed by 67% by weight of the quantity of potassium persulfate in aqueous solution. The resulting mixture was stirred at a rate of the order of 250 rpm while the temperature was maintained at 70° C., for 3 hours. The remaining 33% of potassium persulfate was then added. The remaining 50% of the mixture of monomers was added continuously at a rate of 20 ml/hour. The polymerization time was 6 hours. The latex obtained has a solid content of 21.4% by weight, a mean particle diameter of 148 nm, and a swelling index in methyl methacrylate of 5.2.

Step (a1): Grafting poly(methyl methacrylate) onto the latex from step (a).

The materials employed in this graft polymerization were:

| Materials | Quantities introduced (parts by weight) |
| --- | --- |
| Latex from step (a) | 74.9 (solid part) |
| Methyl methacrylate | 18.9 |
| Potassium persulfate | 0.2 |
| Deionized water present | 294 |
| Divinylbenzene | 0.06 |

The polymerization was carried out at 70° C. for 3 hours. The resulting grafted acrylic latex had a solid content of 24.3% and a mean particle diameter of 158.5 nm.

Step (b): Transfer of the particles of the grafted acrylic latex from step (a1) into methyl methacrylate.

Forty parts by weight of methyl methacrylate, 0.2 part of lauryl mercaptan and 0.2 part by weight of lauroyl peroxide were added to 200 parts by weight of the latex from step (a1), and the resulting mixture was stirred. Next, a mixture consisting of 0.2 part by weight of laurylethyldimethylammonium bromide, 0.12 part by weight of polyvinyl alcohol (marketed under the trade name "Rhodoviol 135") and 160 parts by weight of distilled water was added to it. After vigorously stirring for a few seconds, a stable dispersion of pearls with a diameter of approximately 100–400 μm resulted.

Step (c): Suspension polymerization of the organic phase of the system from step (b).

This suspension polymerization was carried out at a temperature of 70° C. for 5 hours. The pearls were recovered and treated in a conventional manner.

EXAMPLE 4

This example relates to the preparation of an alloy of the impact poly(methyl methacrylate) type, containing 42.3% by weight of grafted elastomeric polymer using the phase transfer technique (described above) by means of a cationic poly(methyl methacrylate) latex.

Step (a): Preparation of a latex of butyl acrylate/styrene copolymer by emulsion copolymerization.

The materials employed in this polymerization were:

| Materials | Quantities introduced (parts by weight) |
| --- | --- |
| Butyl acrylate | 80.7 |
| Styrene | 19.3 |
| Sodium lauryl sulfate | 0.34 |
| Allyl methacrylate (grafting monomer) | 3.4 |
| Potassium persulfate | 0.46 |
| Deionized water | 393 |

The procedure was as in step (a) of Example 1, resulting in a latex which had a solid content of 20.8% by weight, a mean particle diameter of 170 nm, and a swelling index in methyl methacrylate of 2.3.

Step (a1): Grafting poly(methyl methacrylate) onto the latex obtained in step (a).

The materials employed in this grafting were as follows:

| Materials | Quantities introduced (parts by weight) |
| --- | --- |
| Latex from step (a) | 83.2 (solid part) |
| Methyl methacrylate | 17.5 |
| Potassium persulfate | 0.2 |
| Distilled water present | 331 |

The polymerization was carried out at 70° C., for 3 hours, to obtain a latex which had a solid content of 23.3% and a mean particle diameter of 180 nm.

Step (b): Transfer of the particles of the grafted acrylic latex from step (a1) into methyl methacrylate.

This step consisted of transferring the anionic particles of the grafted acrylic latex from step (a1) into methyl methacrylate, using cationic particles of poly(methyl methacrylate) which was synthesized in emulsion. The cationic particles of poly(methyl methacrylate) were prepared by polymerization of 100 parts by weight methyl methacrylate, 0.3 parts by weight lauryl mercaptan, 1.13 parts by weight cetyltrimethylammonium bromide, 365 parts by weight distilled water, and 0.4 parts by weight potassium persulfate. This polymerization was carried out at 70° C., for 2 hours, resulting in a latex having a solid content of 21.6% and a mean particle diameter of 112 nm.

The materials employed are as follows:

| Materials | Quantities introduced (parts by weight) |
| --- | --- |
| Cationic poly(methyl methacrylate) latex from above | 21.6 (solid parts) |
| Grafted elastomeric latex from step (a1) | 35.9 (solid part) |
| Polyvinyl alcohol (marketed under the trade name "Rhodoviol 135") | 0.1 |
| Disodium phosphate | 0.5 |
| Methyl methacrylate | 27 |
| Lauroyl peroxide | 0.2 |
| Lauryl mercaptan | 0.2 |
| Distilled water present | 281 |

A mixture consisting of the cationic poly(methyl methacrylate) latex, polyvinyl alcohol and methyl methacrylate containing lauroyl peroxide and lauryl mercaptan was prepared by vigorous stirring. The grafted elastomeric latex from step (a1) was added all at once to this mixture. A thick mixture resulted, and was made fluid by the addition of disodium phosphate in aqueous solution. The dispersion of monomer containing the grafted elastomer particles and poly(methyl methacrylate) employed as transfer agent had a size close to 200 μm.

Step (c): Suspension polymerization of the dispersion from step (b).

The dispersion from step (b) was polymerized in suspension at a temperature of 70° C. for 6 hours. The pearls were recovered and treated in a conventional manner.

What is claimed is:

1. A process for the manufacture of an impact resistant thermoplastic resin modified with an elastomeric latex, comprising the steps of:
   (a) preparing the elastomeric latex in an aqueous emulsion from at least one ethylenically unsaturated monomer in the presence of an ionic surfactant;
   (b) adding at least one vinyl monomer to the elastomeric latex from step (a), said vinyl monomer being insoluble or substantially insoluble in water, and adding a transfer agent having a charge opposite to that of the surfactant employed in step (a) to transfer the particles of the elastomeric latex into the vinyl monomer; and
   (c) polymerizing the vinyl monomer from step (b).

2. The process of claim 1, wherein the polymerization of step (c) is bulk polymerization.

3. The process of claim 1, wherein the polymerization of step (c) is suspension polymerization.

4. The process of claim 3, wherein said vinyl monomer is dispersed in step (b) by a dispersing agent.

5. The process of claim 1, wherein the quantities of the monomers employed are choosen to produce a thermoplastic resin containing from 1-90% by weight of elastomeric component.

6. The process of claim 1, further comprising the addition to the monomer of step (a) during step (a) of 10 parts by weight of a graft monomer per 100 parts by weight of the monomer.

7. The process of claim 1, further comprising the addition to the monomer of step (a) during step (a) of up to 20 parts by weight of a crosslinking monomer per 100 parts by weight of the monomer.

8. The process of claim 1, wherein the vinyl monomer added in step (b) is added in an amount of at least 10 parts by weight per 100 parts by weight of the solid part of the latex from step (a).

9. The process of claim 1, wherein the transfer agent employed in step (b) is selected from a group consisting of ionic surfactants having charges opposite to the surfactant employed in step (a); a latex synthesized in the presence of a surfactant having charges opposite to the surfactant employed in step (a); and a polyanion or a polycation, said polyanion being employed when the ionic surfactant of step (a) has a positive charge, and said polycation being employed when the ionic surfactant of step (a) has a negative charge.

10. The process of claim 9, wherein said cationic surfactant is selected from the group consisting of quaternary onium salts having a hydrophobic substituent, and onium salts having sterically hindering substituent.

11. The process of claim 9, wherein said polycation is selected from the group consisting of poly(vinylpyridines), quaternized poly(vinylbenzylamines), quarternized celluloses, quaternized polyvinyl alcohols and quaternized poly(alkyl methacrylates).

12. The process of claim 9, wherein said latex employed as a transfer agent is obtained from the monomer employed in step (b).

13. The process of claim 1, wherein the transfer of step (b) is carried out at a temperature between 0° C. and 100° C.

14. An impact resistant thermoplastic resin modified by an elastomeric latex, made by the steps of:
   (a) preparing the elastomeric latex in an aqueous emulsion from at least one ethylentically unsaturated monomer in the presence of an ionic surfactant;
   (b) adding at least one vinyl monomer to the elastomeric latex from step (a), said vinyl monomer being insoluble or substantially insoluble in water, and adding a transfer agent having a charge opposite to that of the surfactant employed in step (a) to transfer the particles of the elastomeric latex into the vinyl monomer; and
   (c) polymerizing the vinyl monomer from step (b).

* * * * *